United States Patent
Burukhin et al.

(10) Patent No.: US 11,307,838 B2
(45) Date of Patent: Apr. 19, 2022

(54) DE-DUPLICATION OF LOCALIZED RESOURCES

(71) Applicant: Microsoft Technology Licensing, LLC, Redmond, WA (US)

(72) Inventors: Anatoliy Burukhin, Redmond, WA (US); Sanjib Saha, Sammamish, WA (US); Mithun Sibi Thomas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

(21) Appl. No.: 16/880,726

(22) Filed: May 21, 2020

(65) Prior Publication Data

US 2021/0365254 A1  Nov. 25, 2021

(51) Int. Cl.
| | |
|---|---|
| *G06F 9/44* | (2018.01) |
| *G06F 8/41* | (2018.01) |
| *G06F 8/60* | (2018.01) |
| *G06F 9/445* | (2018.01) |
| *G06F 9/50* | (2006.01) |
| *G06K 9/62* | (2022.01) |

(52) U.S. Cl.
CPC ............ *G06F 8/4434* (2013.01); *G06F 8/60* (2013.01); *G06F 9/44505* (2013.01); *G06F 9/5011* (2013.01); *G06K 9/6215* (2013.01)

(58) Field of Classification Search
None
See application file for complete search history.

(56) References Cited

U.S. PATENT DOCUMENTS

| | | | |
|---|---|---|---|
| 7,392,519 B2 | 6/2008 | Nguyen et al. | |
| 7,698,126 B2 | 4/2010 | Kohlmeier et al. | |
| 9,928,237 B2 | 3/2018 | Levi et al. | |
| 2001/0044809 A1* | 11/2001 | Parasnis | G06F 9/454 |
| | | | 715/201 |

(Continued)

OTHER PUBLICATIONS

"Internationalization and Localization Wikipedia", Retrieved From: https://en.wikipedia.org/w/index.php?title=Internationalization_and_localization&oldid=956673202, May 14, 2020, 9 Pages.

(Continued)

*Primary Examiner* — Insun Kang
(74) *Attorney, Agent, or Firm* — NovoTechIP International PLLC

(57) ABSTRACT

In a device for de-duplicating localized resources including a processor and a memory in communication with the processor, the memory includes executable instructions that, when executed by the processor, cause the processor to control the device to perform functions of accessing, from a data storage, a source resource package and a localized resource package containing first and second resources, respectively; filtering the localized resource package to identify the second resources that are not duplicates of the first resources; creating, based on the first resources, a language-neutral resource collection including a plurality of language-neutral resources; creating a localized resource collection including the second resources that are not duplicates of the first resources; and creating a deployment resource package containing the language-neutral and localized resource collections.

20 Claims, 12 Drawing Sheets

(56) References Cited

U.S. PATENT DOCUMENTS

| | | | | |
|---|---|---|---|---|
| 2004/0205118 | A1* | 10/2004 | Yu | G06Q 30/02 |
| | | | | 709/203 |
| 2008/0033711 | A1 | 2/2008 | Atkin et al. | |
| 2015/0121199 | A1 | 4/2015 | Wu et al. | |
| 2016/0103826 | A1* | 4/2016 | Lui | G06F 40/205 |
| | | | | 704/3 |
| 2020/0394059 | A1* | 12/2020 | Wei | G06F 40/58 |
| 2021/0064699 | A1* | 3/2021 | Burukhin | G06F 9/454 |

OTHER PUBLICATIONS

"Microsoft Deployment Toolkit 2012 Update 1—Using the Microsoft Deployment Toolkit", In Microsoft MDTdocumentation Online, Aug. 2012, 592 Pages.

"International Search Report and Written Opinion Issued in PCT Application No. PCT/US21/022862", dated Jun. 28, 2021, 15 Pages.

"Android and iOS Apps Localization", Retrieved from: https://support.crowdin.com/apps-localization/, Retrieved Date: Apr. 3, 2020, 3 Pages.

"Babble-on", Retrieved from: https://web.archive.org/web/20171007065335/http:/www.ibabbleon.com/iphone_app_localization.html, Oct. 7, 2017, 14 pages.

"iOS Localization Guide for Multilingual iPhone and iPad Apps", Retrieved from: https://web.archive.org/web/20190105080419/https:/www.icanlocalize.com/site/tutorials/iphone-applications-localization-guide/, Jan. 5, 2019, 10 Pages.

"Resource Programming Guide", Retrieved from: https://web.archive.org/web/20191214215428/https:/developer.apple.com/library/archive/documentation/Cocoa/Conceptual/LoadingResources/Strings/Strings.html, Dec. 14, 2019, 9 Pages.

Goto, et al., "Detecting Untranslated Content for Neural Machine Translation", In Proceedings of the First Workshop on Neural Machine Translation, Aug. 4, 2017, pp. 47-55.

* cited by examiner

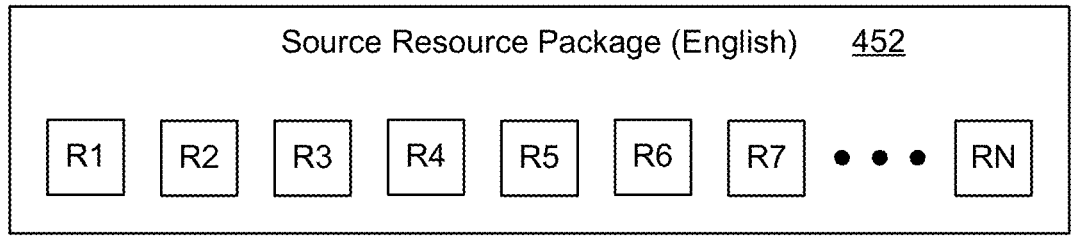
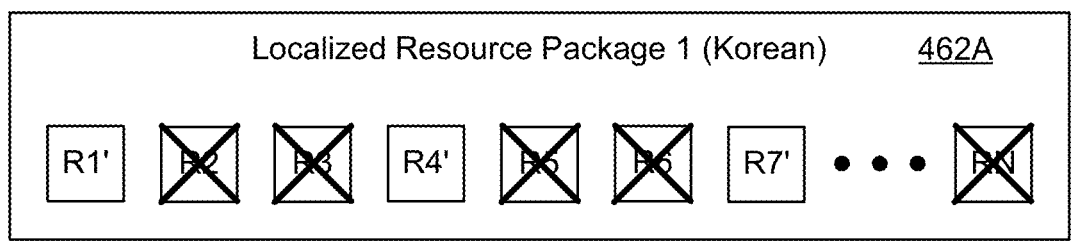
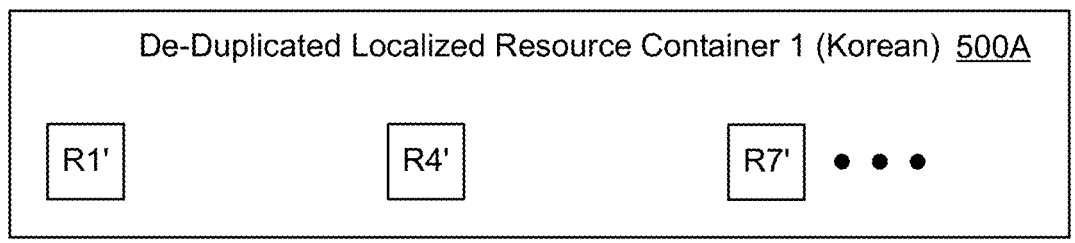
FIG. 5A

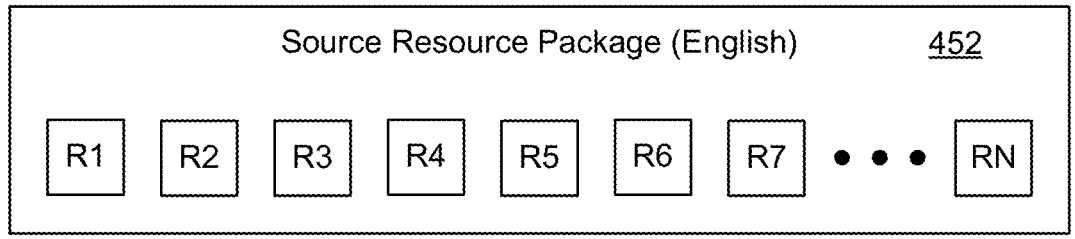
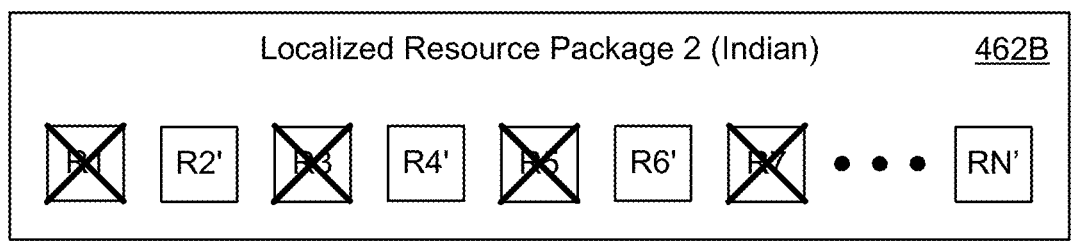
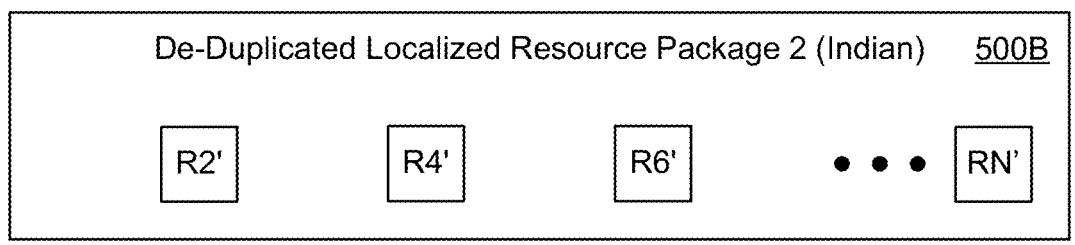
FIG. 5B

700

710 ACCESSING A SOURCE RESOURCE PACKAGE AND A LOCALIZED RESOURCE PACKAGE STORED IN A DATA STORAGE, THE SOURCE RESOURCE PACKAGE CONTAINING A PLURALITY OF FIRST RESOURCES AND THE LOCALIZED RESOURCE PACKAGE CONTAINING A PLURALITY OF SECOND RESOURCES CORRESPONDING TO THE FIRST RESOURCES

720 DE-DUPLICATING, BASED ON THE FIRST RESOURCES OF THE SOURCE RESOURCE PACKAGE, THE SECOND RESOURCES CONTAINED IN THE LOCALIZED RESOURCE PACKAGE;

730 CREATING, BASED ON THE FIRST RESOURCES CONTAINED IN THE SOURCE RESOURCE PACKAGE, A NEUTRAL RESOURCE CONTAINER CONTAINING A PLURALITY OF LANGUAGE-NEUTRAL RESOURCES;

740 CREATING, BASED ON THE DE-DUPLICATION OF THE SECOND RESOURCES, A LOCALIZED RESOURCE CONTAINER CONTAINING THE SECOND RESOURCES THAT ARE NOT DUPLICATE WITH RESPECT TO THE FIRST RESOURCES OF THE SOURCE RESOURCE PACKAGE

750 CREATING A DEPLOYMENT RESOURCE PACKAGE CONTAINING THE NEUTRAL RESOURCE CONTAINER AND THE LOCALIZED RESOURCE CONTAINER.

FIG. 7

DE-DUPLICATION OF LOCALIZED RESOURCES

BACKGROUND

In software product development, localization or language localization refers to a process of adapting a product's translation to a specific country or region. This adaptation is one of most important phases in product translation and cultural adaptation (for specific countries, regions, cultures, or groups) to account for differences in distinct markets, a process known as internationalization and localization. Localization differs from translation in that localization involves a comprehensive study of the target culture in order to correctly adapt the product to local needs. Hence, localization is typically outsourced to companies located locally at the target geographic locations. Upon completing the localization, each localized package is delivered to the software developer, which in turn creates a deployment package comprising a source product package developed by the developer and the localized packages. The deployment package is delivered to a client who then deploys the deployment package to its hardware assets.

SUMMARY

In an implementation, a device for de-duplicating localized resources includes a processor and a memory in communication with the processor. The memory includes executable instructions that, when executed by the processor, cause the processor to control the device to perform functions of accessing, from a data storage, a source resource package and a localized resource package containing first and second resources, respectively; filtering the localized resource package to identify the second resources that are not duplicates of the first resources; creating, based on the first resources, a language-neutral resource collection including a plurality of language-neutral resources; creating a localized resource collection including the second resources that are not duplicates of the first resources; and creating a deployment resource package containing the language-neutral and localized resource collections.

In another implementation, a method of operating a device for de-duplicating localized resources includes accessing, from a data storage, a source resource package and a localized resource package containing first and second resources, respectively; filtering the localized resource package to identify the second resources that are not duplicates of the first resources; creating, based on the first resources, a language-neutral resource collection including a plurality of language-neutral resources; creating a localized resource collection including the second resources that are not duplicates of the first resources; and creating a deployment resource package containing the language-neutral and localized resource collections.

In another implementation, a device includes a non-transitory computer readable medium contains instructions which, when executed by a processor, cause a computer to perform functions of accessing, from a data storage, a source resource package and a localized resource package containing first and second resources, respectively; filtering the localized resource package to identify the second resources that are not duplicates of the first resources; creating, based on the first resources, a language-neutral resource collection including a plurality of language-neutral resources; creating a localized resource collection including the second resources that are not duplicates of the first resources; and creating a deployment resource package containing the language-neutral and localized resource collections.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A, 5B, 5C and 5D illustrate implementations of de-duplication/filtering of various localized resource packages.

FIG. 7 illustrates a flow diagram showing an implementation of a process for de-duplicating a localized resource package.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to reducing a data size of a multi-language software product package by de-duplicating localized resource packages created for supported languages. The localized resource packages are developed based on a source resource package. During the localization, some resources may not need to be localized and remain the same as ones in the source resource package. Upon completing the localization, each localized resource package is de-duplicated/filtered to remove those resources that are identical to the resources of the source resource package. This may result in significantly reducing a data size of the localized resource package. Then, with the resources remaining in each localized resource package after de-duplication/filtering, a localized resource container is created. Also, a language-neutral resource container is created with the resources of the source resource package. The language-neutral resource container and localized resource containers are then included in a deployment product package, which is delivered to a client for deployment to a plurality of hardware assets. For example, a deployment resource package may be created, which may include collections of the language-neutral resources and localized resources. Each collection may be stored in a separate container (e.g., file folder) with a proper identification. A database or table may be created to indicate a location of each resource in the containers. The deployment resource package may then be included in the deployment product package along with other parts of the software product, such as software executables, etc.

Figure 1A:
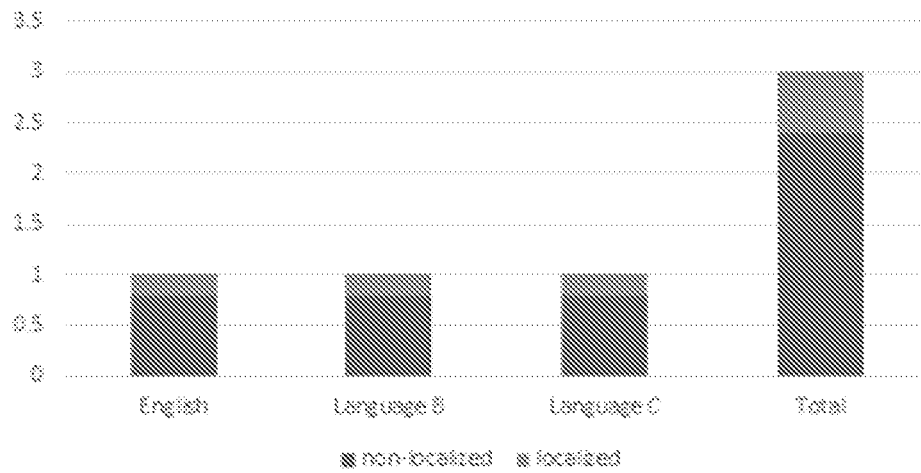
FIG. 1A is a chart showing data sizes of various resource packages without de-duplication.

The de-duplication/filtering may significantly reduce the footprint of the deployment product package, which makes it easier to deliver and deploy the deployment product package. Also, the de-duplication may occupy significantly less storage space when the deployment resource package is installed in the hardware assets. For example, as shown in FIG. 1A, when the localized resource packages are not de-duplicated, the resulting data size of the deployment resource package may be the sum of the data size of the English source resource package and two localized (Language B and Language C) resource packages. By de-duplicating the localized resource packages, the resulting data size of the deployment resource package may be less than 50% larger than the source resource package. As such, the disclosure provides technical solutions to various technical problems that come with various localizations and delivery and deployment of localized software packages.

Once the software product is installed, a situation may occur that requires a particular resource to be loaded. Depending on whether the resource is localized or not, the resource can be found in either the localized resource container or the language-neutral resource container. Hence, the localized resource container may be searched first and then the language-neutral resource container to locate the resource. As such, despite being significantly smaller in the data size and resource numbers, the software package may suffer no performance degradation with respect to the localized resources.

Figure 2:
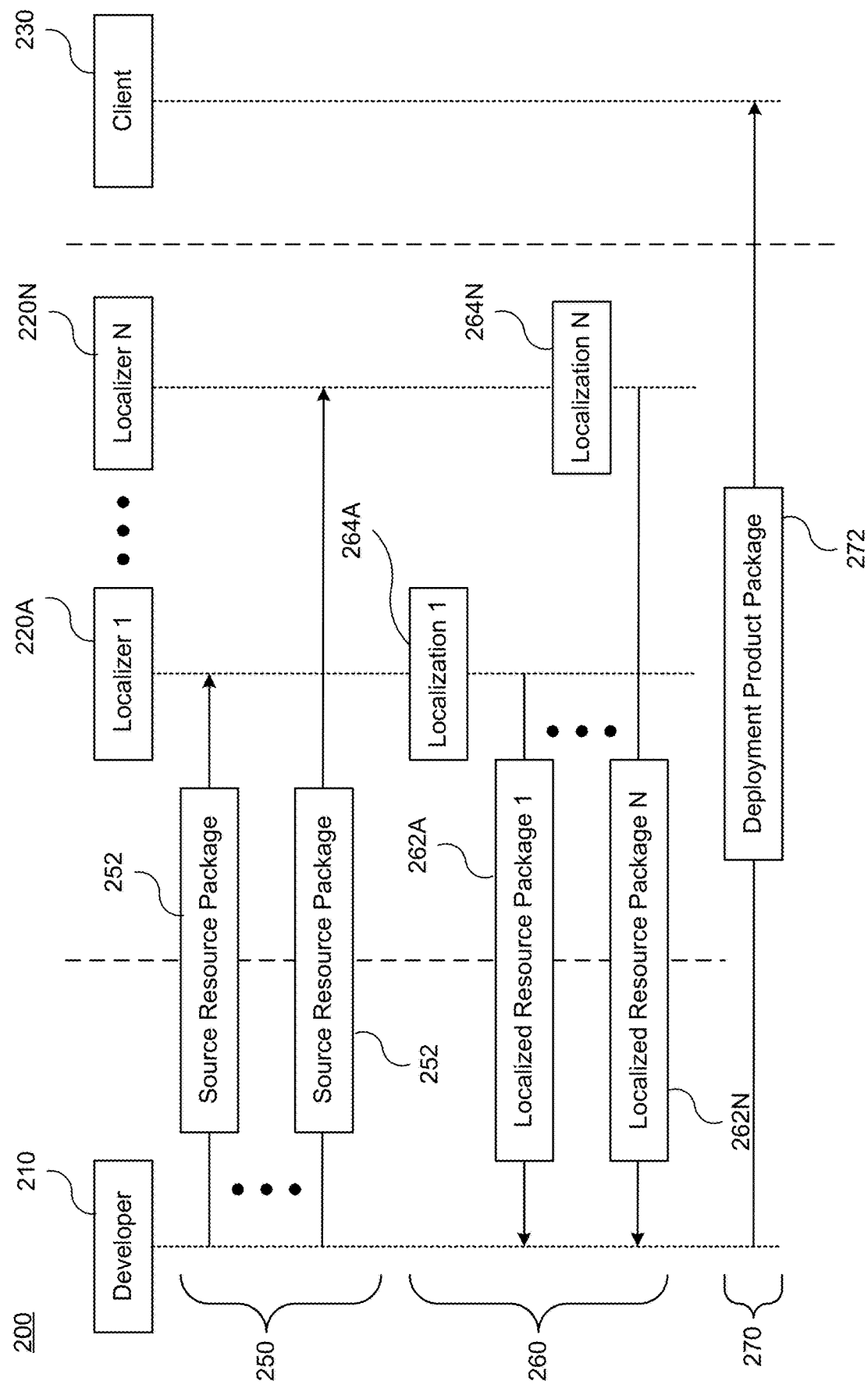
FIG. 2 illustrates an implementation of a process for resource localization and resource package deployment.

FIG. 2 illustrates an implementation of a process 200 for resource localization and resource package deployment among a developer 210, a plurality of localizers 220A to 220N and a client 230. The process 200 may consist of a first phase 250 for disturbing a source resource package 252 to the localizers 220A to 220N; a second phase 260 for localization, during which the resources included in the source resource package 252 are localized by the localizers 220A to 220N to create localized resource packages 262A to 262N; and the final phase 270 for finalizing and delivering a deployment product package 272 to the client 230.

The source resource package 210 may include a plurality of resources (e.g., images, text, UI elements, etc.). The source resource package 210 may be developed in a particular authoring language (e.g., English). Different localizations may require different groups of resources to be localized. For example, a resource (e.g., menu text) that needs to be localized for a Chinese language localization may not need to be localized for a UK language localization.

Hence, it is difficult for the developer 210 to know in advance or predict which resources would be localized in each localization process, and hence the developer 210 may not be able to come up with different source resource packages for different localizers 220, which precisely include only those resources requiring localizations for the particular localizers. Even if such precise prediction were possible, it would be time and resource consuming while providing no meaningful advantages over letting the localizers 220A to 220N review the resources and decide which resources need to be localized. Hence, the develop 210 may have no choice but distributing the same source resource package to all the localizers 220A to 220N.

Upon receiving the source resource package 252, the localizers 220A to 220N perform respective localizations 264A to 264N of the resources included in the source resource package 252 and develop respective localized resource package 262A to 262N, which are collected by the developer 200. During the localizations 264A to 264N, each of the localizer 220A to 220N selects the resources to be localized. Such selection may vary from one localizer to another. A resource (e.g., menu text) that needs to be localized for one language (e.g., Chinese) may not need to be localized for another language (e.g., UK or Australia). Hence, each of the localized resource packages 262A to 262N may include a different number of localized resources and a different number of untouched resources. Also, the number of resources and the data size of each localized resource package may be the same or similar to those of the source resource package 252. In the third phase 270, the deployment product package 272 is created, which includes the source resource package 252 and all the localized resource packages 262A to 262N. The deployment product package 272 may then be delivered to the client 230 for deployment to hardware assets (e.g., computes, mobile devices, etc.).

Figure 3:
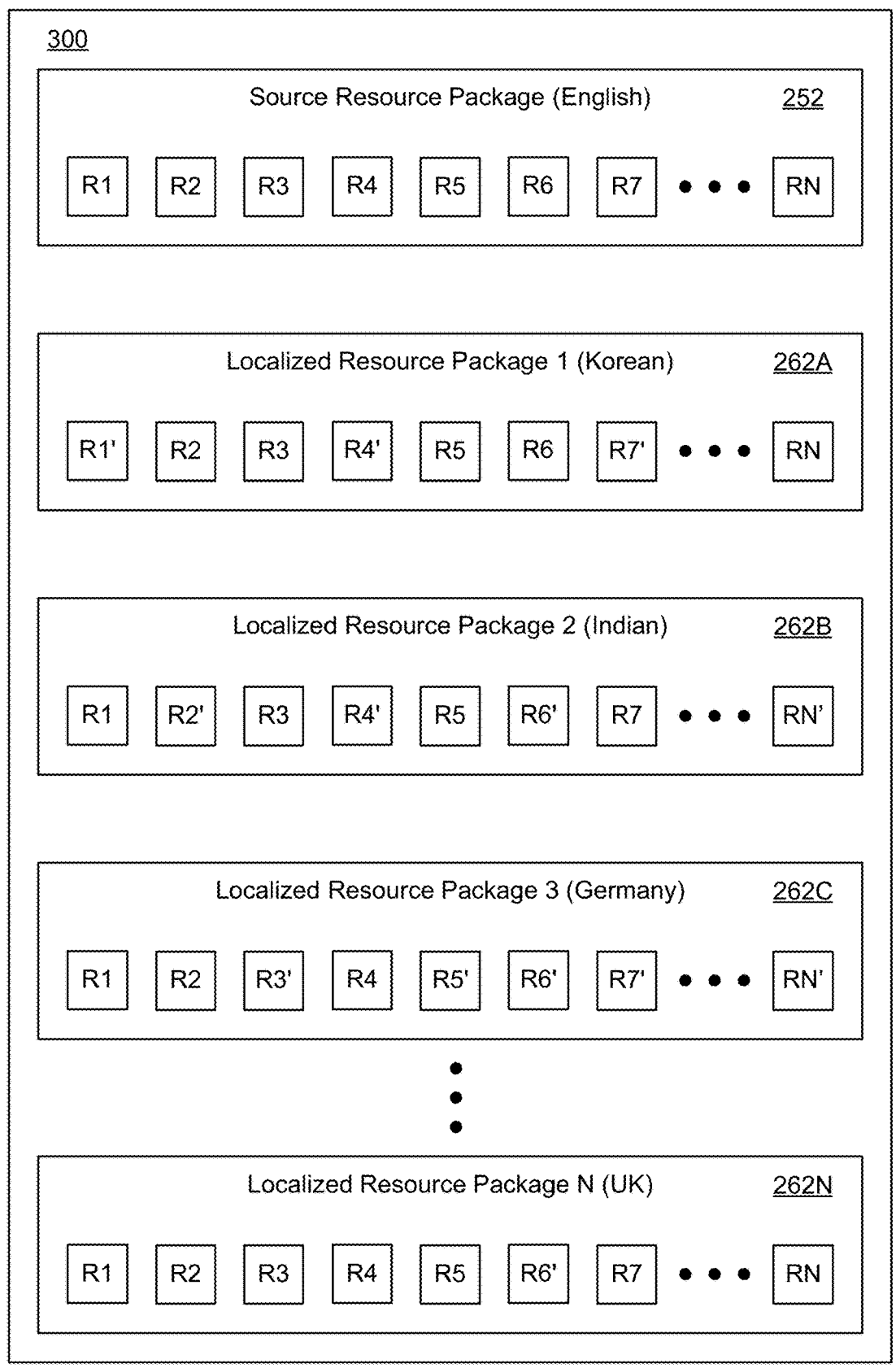
FIG. 3 illustrates an implementation of a deployment resource package.

FIG. 3 shows an example deployment resource package 300, which may be created based on the process 200 shown in FIG. 2. The package 300 may include the source resource package 252 and a plurality of localized resource packages 262A to 262N. The source resource package 252 may include a number of resources R1 to RN. The localized resource packages 262A to 262N may also include a number of corresponding resources, of which some are localized and others are not. For example, the first localized (e.g., Korean) resource package 262A may include localized resources R1', R4', R7', etc., which corresponds to resources R1, R4, R7, etc. of the source resource package 252. Other resources, such as R2, R3, R5, RN, etc., may remain untouched and identical to the corresponding resources R2, R3, R5, RN, etc. of the source resource package 252. Hence, both the source resource package 252 and first localized resource package 262A may have the same number of the resources. Also, considering that localization normally does not cause a drastic change in a data size, both source resource package 252 and first localized resource package 262A may have very similar data sizes.

Other localized packages 262B to 262N may have the same number of resources as the source resource package 252 although different combinations of the resources may be localized in different localized packages. For example, the second localized (e.g., Indian) resource package 262B may include localized resources R2', R4', R6', RN', etc. while resources R1, R3, R5, R7, etc. remain the same with the corresponding resources of the source resource package 252. The third localized (e.g., German) resource package 262C may include localized resources R3', R5', R6', R7', RN', etc.

while other resources remain the same with the corresponding resources of the source resource package 252. The final localized (e.g., UK) resource package 262N may include only one localized resource R6' while the rest is identical to the corresponding resources of the source resource package 252. The data size of each localized resource package may be similar to that of the source resource package 252.

Such inclusion of the complete localized resource packages 262A to 262N in the deployment resource package 300 may cause various technical problems. For example, some software products are localized in more than 100 different languages, which means that the deployment resource package 300 may be more than 100 times bigger than the source resource package 252 and may include more than 100 times more resources than the source resource package 252. The resultant deployment resource package 300 may be too large to be delivered to the client 230 and to be deployed to numerous hardware assets. Hence, a large network bandwidth may be required to deliver the package 300 to the client 230. Such large data transfer may result in transfer failures or interruptions caused by network load overflows. It is even a bigger challenge to deploy such large package to numerous hardware assets via a private network within an organization, which may take an extended period of time to complete even no network failure or transfer interruption occurs. Furthermore, upon being deployed to each hardware asset, the successfully installed software package takes a large storage space of local storage devices. Considering that a typical user normally needs none or only one localization support, most of the storage space would be wasted for storing the localized resources packages that the user may never use. This could be regarded as inefficient utilization of company assets from the management perspectives. Furthermore, when a new source resource needs to be dispatched or an existing source resource installed in the hardware assets needs to be updated, all the source and localized resource packages installed in each hardware asset needs to be updated. This may require creating, delivering, and deploying a large resource update package, which includes a source resource update package and a number of localized resource update packages, each of which includes the same new resource or update.

Figure 4:
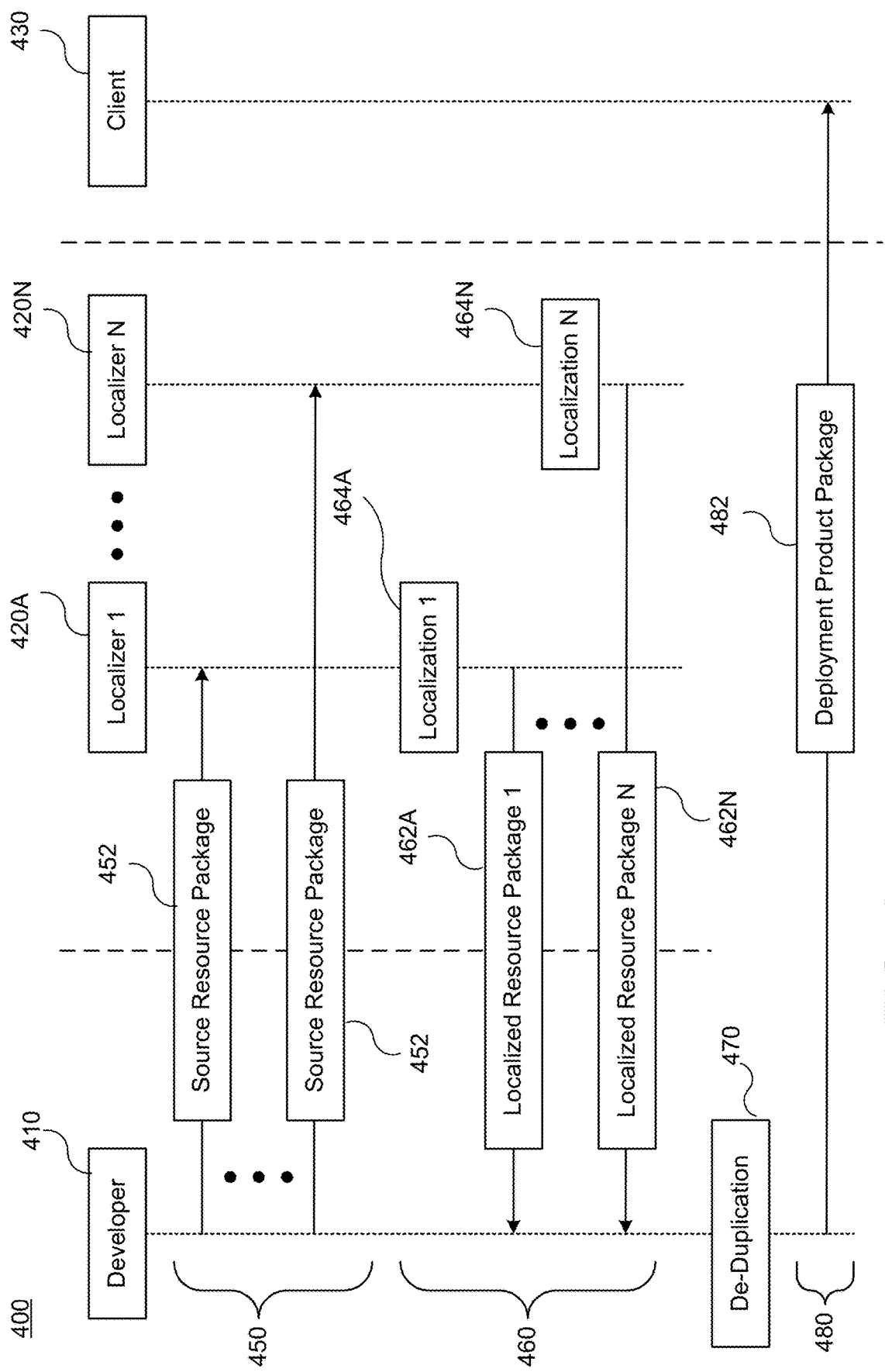
FIG. 4 illustrates an implementation of a process for resource localization, de-duplication/filtering, and resource package deployment.

FIG. 4 illustrates an implementation of a process 400 for source resource localization, de-duplication/filtering, and resource package deployment among a developer 410, localizer 420A to 420N and client 430. The process 400 provides technical solutions to the technical problems associated with the process 200. Similar to the process 200 shown in FIG. 2, the process 400 may consist of a first phase 450 for distributing a source resource package 452 to the plurality of localizers 420A to 420N; and a second phase 460 for localizations 464A to 464N of the source resource package 452 by different localizers 420A to 420N. However, the process 400 differs from process 200 in that localized resource packages 462A to 462N are de-duplicated to remove, from each of the localized resource packages 462A to 462N, the resources that are not localized and hence remain the same as the corresponding resources of the source resource package 452. This may result in significant data size reduction in each of localized resource packages 462A to 462N, and more drastic data size reduction in a resultant deployment product package 482.

Figure 5C:
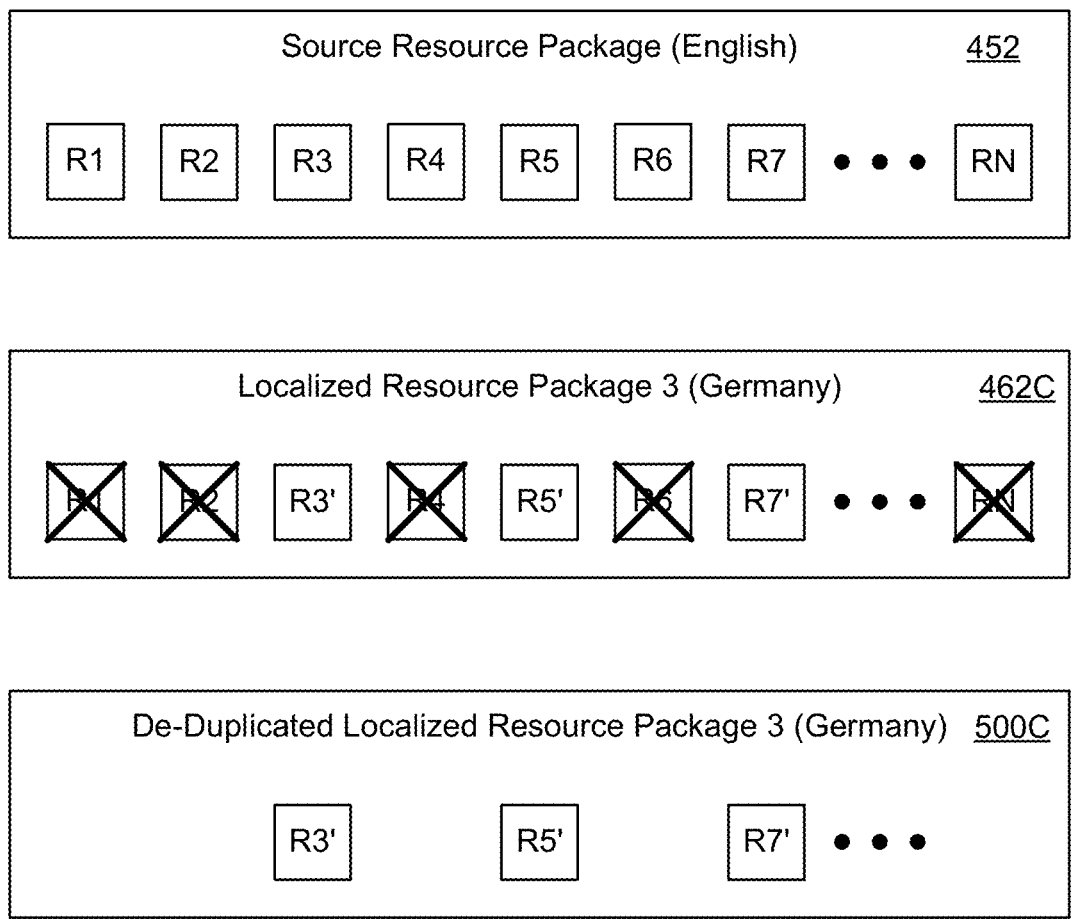

FIGS. 5A, 5B, 5C and 5D illustrate example de-duplication/filtering processes for the localized resource packages 462A to 462N. In FIG. 5A, which shows de-duplication of the first localized resource package 462A, the resources (e.g., the localized resources R1', R4', R7', etc. and non-localized resources R2, R3, R5, R6, RN, etc.) of the localized resource package 462A are individually compared to the resources R1 to RN of the source resource package 452. Based on the comparison, it is seen that the resources R2, R3, R5, R6, RN, etc. are the same as the corresponding resources R2, R3, R5, R6, RN, etc. of the source resource package 452. Then, the identified resources R2, R3, R5, R6, RN, etc. are removed from the first localized resource package 462A, which is shown by the "X" symbols covering the resources R2, R3, R5, R6, RN. This results in removing, from the first localized resource package 462A, the resources that are also available from the source resource package 452.

Then a first de-duplicated localized resource container 500A may be created, which only includes the resources remaining in the first localized resource package 462A after the de-duplication. For example, the first localized resource package 462A may be de-duplicated and then converted to the first de-duplicated localized resource container 500A. The first de-duplicated localized resource container 500A may contain only the localized resources R1', R4', R7', which are not available from the first source resource package 452. As such, the de-duplicated localized resource container 500A may include a far smaller number of the resources and may have a far smaller data size compared to the first localized resource package 462A.

Figure 5D:
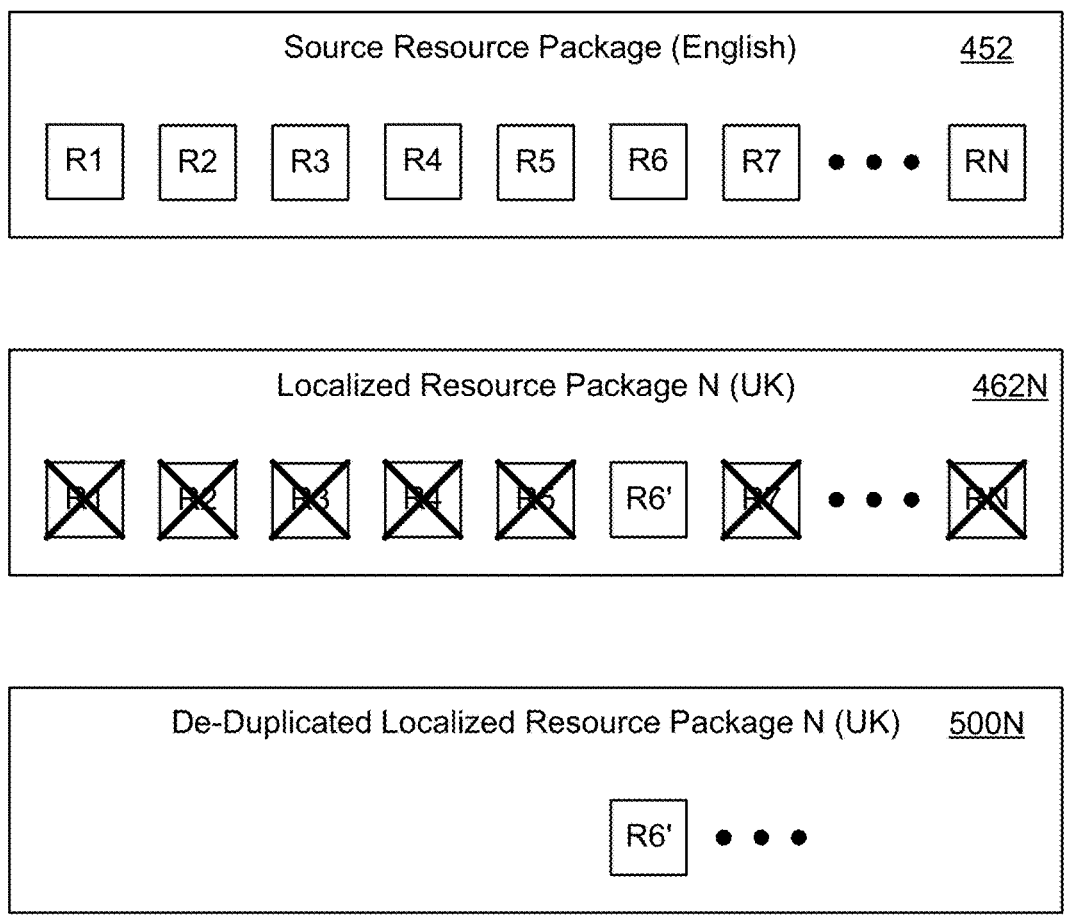

Other localized resource packages 462B to 462N may be de-duplicated in a similar manner. For example, as shown in FIG. 5B, each of the resources of the second localized resource package 462B may be compared to the resources of the source resource package 452 to identify and remove, from the second localized resource package, the resources R1, R3, R5, R7, etc. that are not localized and hence are remain the same as the corresponding resources R1, R3, R5, R7, etc. of the source resource package 452. Then, second de-duplicated localized resource package 500B may be created, which may include only the resources R2', R4', R6', RN', etc., which are not available from the source resource package 452. FIG. 5C shows the third localized resource package 462C being de-duplicated and a third de-duplicated localized resource package 500C being created, which includes the localized resources R3', R5', R7', etc. FIG. 5D shows the last localized resource package 462N being de-duplicated and a new de-duplicated localized resource package 500N being created, which includes R6', etc.

Figure 1B:
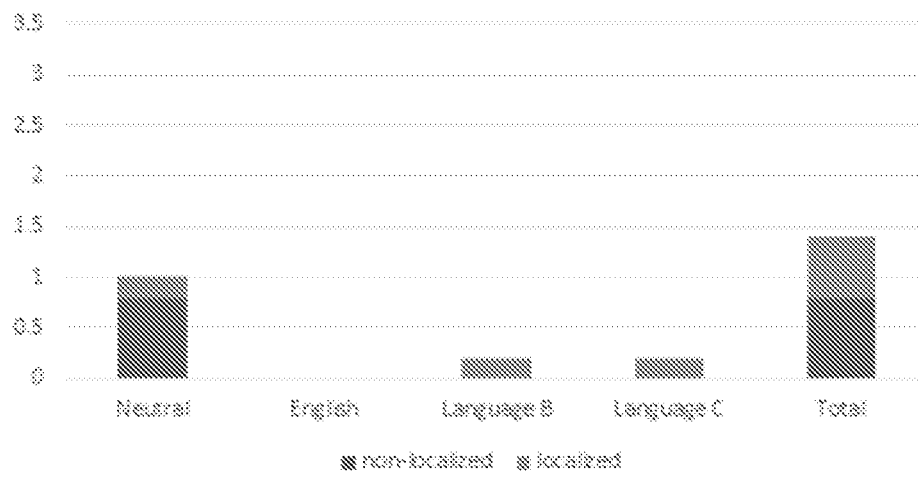
FIG. 1B is a chart showing sizes of various resource packages after de-duplication of localized resource packages.
Figure 6:
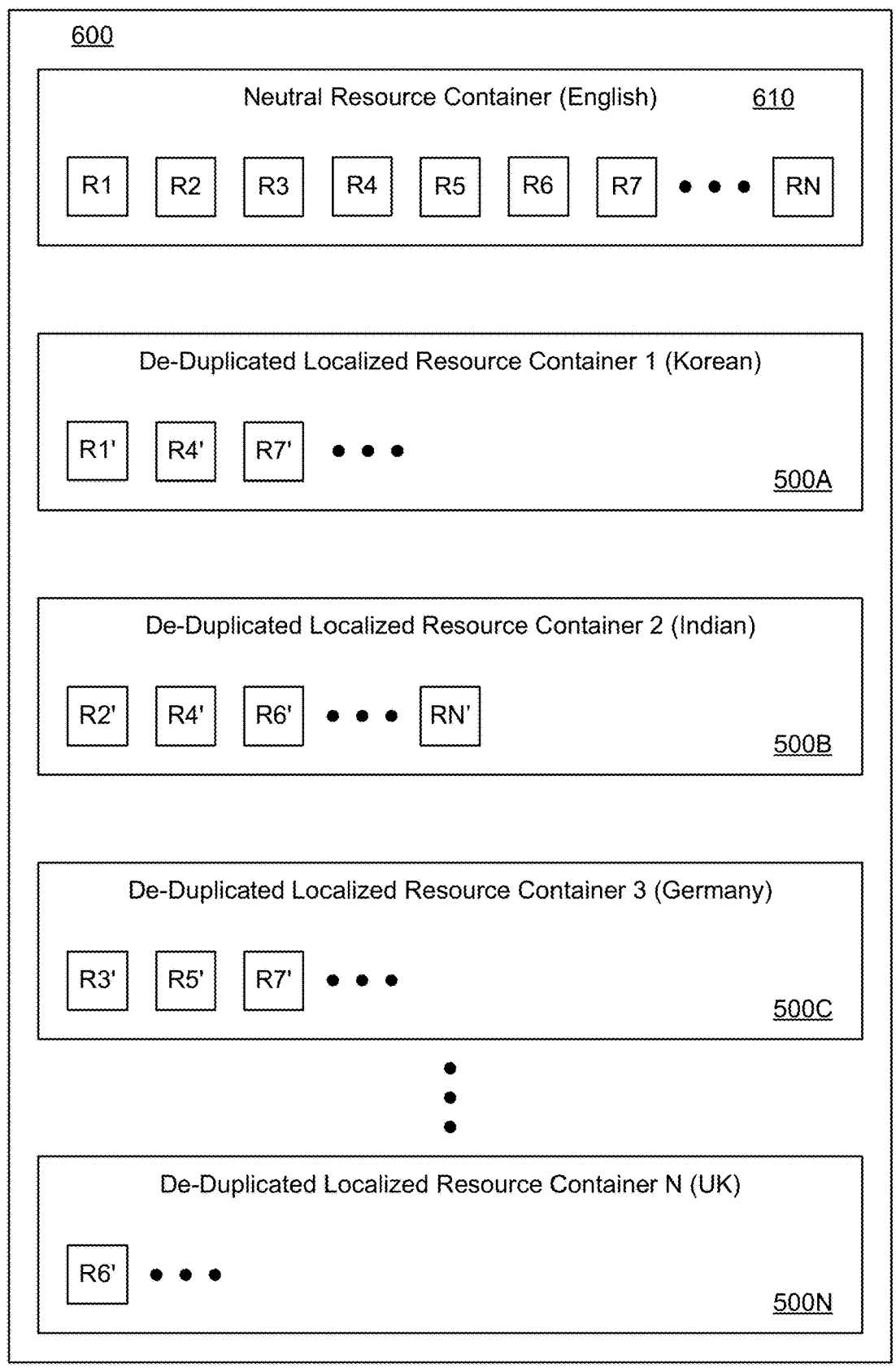
FIG. 6 illustrates an implementation of a deployment resource package after de-duplication.

FIG. 6 illustrates an implementation of a deployment resource package 600, which may consist of a language-neutral resource container 610 and the de-duplicated localized resource containers 500A to 500D. The language-neutral resource container 610 may contain language-neutral or universal resources that are invariable regardless of the localization type. For example, an icon image file may be universal to all localization type and hence may not need to be localized. The language-neutral resources may include the resources R1 to RN that are in the authoring language (e.g., English) of the source resource package 252, which is developed by the developer 410. Hence, as shown in FIG. 1B, the language-neutral resource container 610 may also function as an English-language localized resource container while also serving as the universal resource container for the de-duplicated localized resource containers 500A to 500N.

Compared to the corresponding localized resource containers 262A to 262N of the deployment resource package 300 shown in FIG. 3, the de-duplicated localized resource containers 500A to 500N may contain far smaller numbers of resources and have far smaller data sizes. This may result in significant reduction in the resource number and file size of the deployment resource package 600 when compared to the deployment resource package 300 without de-duplication. Hence, the deployment resource package 300 may be delivered to the client 430 and deployed to the hardware assets of the client 430 without needing a large network bandwidth or causing transmission interruptions or corruptions. Also, once successfully installed in the hardware assets, the software package may occupy a far smaller storage space in each hardware asset. Furthermore, when there is a need to dispatch a new language-neutral resource or update an existing language-neutral resource, only the neutral resource container 610 may need to be updated for the new language-neutral resource or update. The localized resource containers 500A to 500N do not contain any language-neutral resource and therefore do not need to be updated at all. Hence, a language-neutral resource update package including only the new language-neutral resource or update may be created, delivered, and dispatched to each hardware asset. This may eliminate a need to create, deliver and deploy an update package for each of the numerous localized resource packages. Accordingly, the de-duplication of the localized resource packages can provide feasible and practical technical solutions to the technical problems accompanied with the delivery and deployment of any software product packages.

FIG. 7 is a flow diagram showing an implementation of a process 700 for de-duplicating/filtering a localized resource package. The process 700 may be carried out by a device, such as a device 900 shown in FIG. 9, which may include a processor and a memory in communication with the processor, and the memory may include executable instructions that, when executed by the processor, cause the processor to control the device to perform the functions of the process 700. The device may be operating at the developer 410, but may also be operating at any one or more localizers 420A to 420N or a third party. The device may include a local data storage (e.g., HDD, SSD, etc.) or connected to a remote data storage, such as a remote file server, cloud data storage, etc. The source resource package 452 and the localized resources package 452A to 452N may be stored in one or more of the local data storage, remote data storage and cloud data storage.

With references to FIGS. 4, 5A to 5D and 6, at step 710, the device may access the source resource package 452 and a localized resource package, such as, the first localized resource package 462A, stored in the data storage. The source resource package 452 may contain plurality of first resources R1 to RN, and the localized resource package containing a plurality of second resources, such as the localized resources R1', R4', R7', etc. and the resources R2, R3, R5, R6, etc.

In step 720, the device may de-duplicate, based on the first resources R1 to RN of the source resource package 462A, the second resources contained in the localized resource package 462A. For example, as shown in FIG. 5A, the resources (e.g., the localized resources R1', R4', R7', etc. and non-localized resources R2, R3, R5, R6, RN, etc.) of the localized resource package 462A are individually compared to the resources R1 to RN of the source resource package 452. Based on the comparison, it may be identified that the resources R2, R3, R5, R6, RN, etc. are the same as the corresponding resources R2, R3, R5, R6, RN, etc. of the source resource package 452. Then, the identified resources R2, R3, R5, R6, RN, etc. are removed from the first localized resource package 462A, which is shown by the "X" symbols covering the resources R2, R3, R5, R6, RN. This may result in removing, from the first localized resource package 462A, the resources that are also available from the source resource package 452. In an implementation, a similarity level (e.g., 80%, 95%, etc.) may be predetermined prior to the comparison, and then the resources of the localized resource package 462A are compared to the resources R1 to RN of the source resource package 452 to find the resources that meet the predetermined similarity level with respect to any of the resources R1 to RN of the source resource package 452.

At step 730, the device may create, based on the first resources R1-RN contained in the source resource package 452, the neutral resource container 610 containing a plurality of language-neutral resources R1 to RN, as shown in FIG. 6. For example, the first localized resource package 462A may be de-duplicated and then converted to the first de-duplicated localized resource container 500A. The first de-duplicated localized resource container 500A may contain only the localized resources R1', R4', R7', which are not available from the first source resource package 452. The neutral resource container 610 may contain language-neutral or universal resources that are invariable regardless of the localization type. For example, an icon image file may be universal to all localization types and hence may not need to be localized. The language-neutral resources may include the resources R1 to RN that are in the authoring language (e.g., English) of the source resource package 252, which is developed by the developer 410. Hence, as shown in FIG. 1B, the language-neutral resource container 610 may also function as an English-language localized resource container while further serving as the universal resource container for the de-duplicated localized resource containers 500A to 500N.

At step 740, the device may create, based on the de-duplication of the second resources of the first localized, the de-duplicated localized resource container 500A containing the second resources R1', R4', R7', that are not duplicate with respect to the resources R1 to RN of the neutral e resource container 610. As such, the de-duplicated localized resource container 500A may include a far smaller number of the resources and may have a far smaller data size compared to the first localized resource package 462A.

At step 750, the device may create a deployment resource package 600 containing the neutral resource container 610 and the de-duplicated localized resource container 500A. The process 700 may be repeated for the remaining localized resource packages 462A to 462N, which may result in creating the plurality of de-duplicated localized resource containers 500B to 500N. As the result, the deployment resource package 600 may include the neutral resource container 610 and de-duplicated localized resource containers 500A to 500N, as shown in FIG. 6. Compared to the corresponding localized resource containers 262A to 262N of the deployment resource package 300 shown in FIG. 3, the de-duplicated localized resource containers 500A to 500N may contain far smaller numbers of resources and have far smaller data sizes. This may result in significant reduction in the resource number and file size of the deployment resource package 600 when compared to the deployment resource package 300 without de-duplication. Accordingly, the de-duplication of the localized resource packages can provide feasible and practical technical solutions to the technical problems accompanied with the delivery and deployment of any software product packages.

Figure 8:
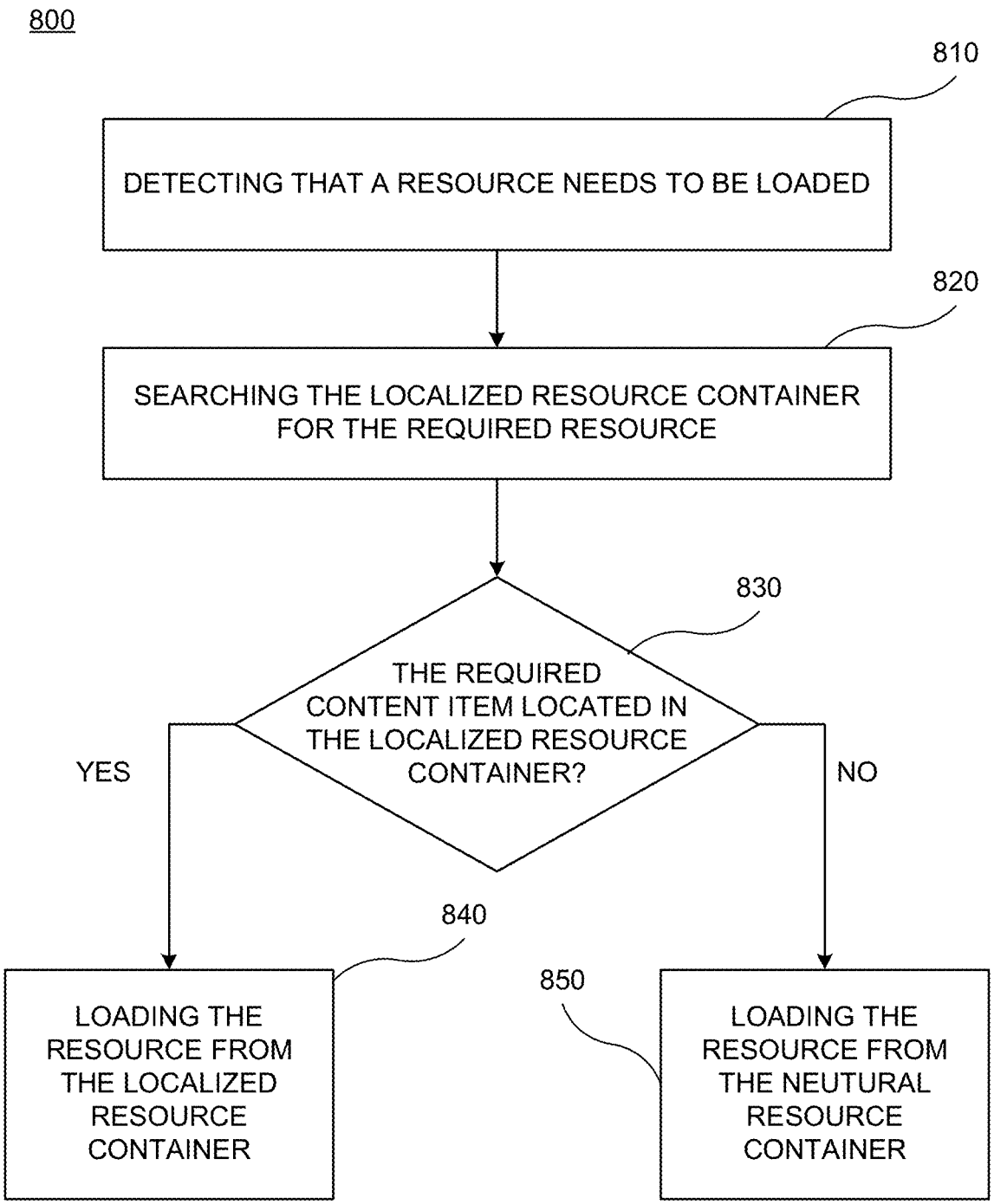
FIG. 8 illustrates a flow diagram showing an implementation of a process for locating and loading a required resource from a resource container.

FIG. 8 is a flow diagram showing an implementation of a process 800 for locating and loading a resource after the resource package 600 is deployed to a local device (e.g., computer, mobile device, etc.). The local device may include a processor and a memory in communication with the processor, and the memory may include executable instructions that, when executed by the processor, cause the processor to control the device to perform the functions of the process 800. The device may include a local data storage (e.g., HDD, SSD, etc.) or connected to a remote data storage, such as a remote file server, cloud data storage, etc., which may store the deployment resource package 600 including the neutral resource container 610 and de-duplicated localized resource containers 500A to 500N, as shown in FIG. 6.

At step 810, the device may detect that a particular resource needs to be loaded. For example, a user may initiate an application, which requires rendering a graphical user interface (GUI) for the application. The GUI rendering may require loading a number of resources (e.g., icon images, menu text, etc.).

At step 820, the device may search one of the localized resource containers 500A to 500N that has been pre-selected for the particular user or local device. For example, the user, who mainly speaks Spanish, may pre-select the Spanish localized resource container as the main localized resource container. The device may then search the Spanish localized resource container to find the required resource (e.g., Spanish menu text).

At step 830, the device may then determine whether the required resource is located in the localized resource container. In some cases, the required resource may be a localized resource (e.g., Spanish menu text) and hence may be found in the Spanish localized resource container (YES at Step 830). Then, at step 840, the resource is loaded from the localized resource container. When the required resource is not localized (e.g., a button image), the required resource may not be found in the Spanish localized resource container (NO at Step 830). In such case, the required resource may be a language-neutral resource that is universal to any localized resource packages and hence is most likely to be stored in the language-neutral resource container 610. Hence, at step 850, the required resource is then loaded from the neutral resource container 610. As such, the deployment resource package 600 installed in the local devices may provide the same performance as the deployment resource package 300 shown in FIG. 3 while being much smaller in the data size and resource number when compared to the deployment resource package 300.

Figure 9:
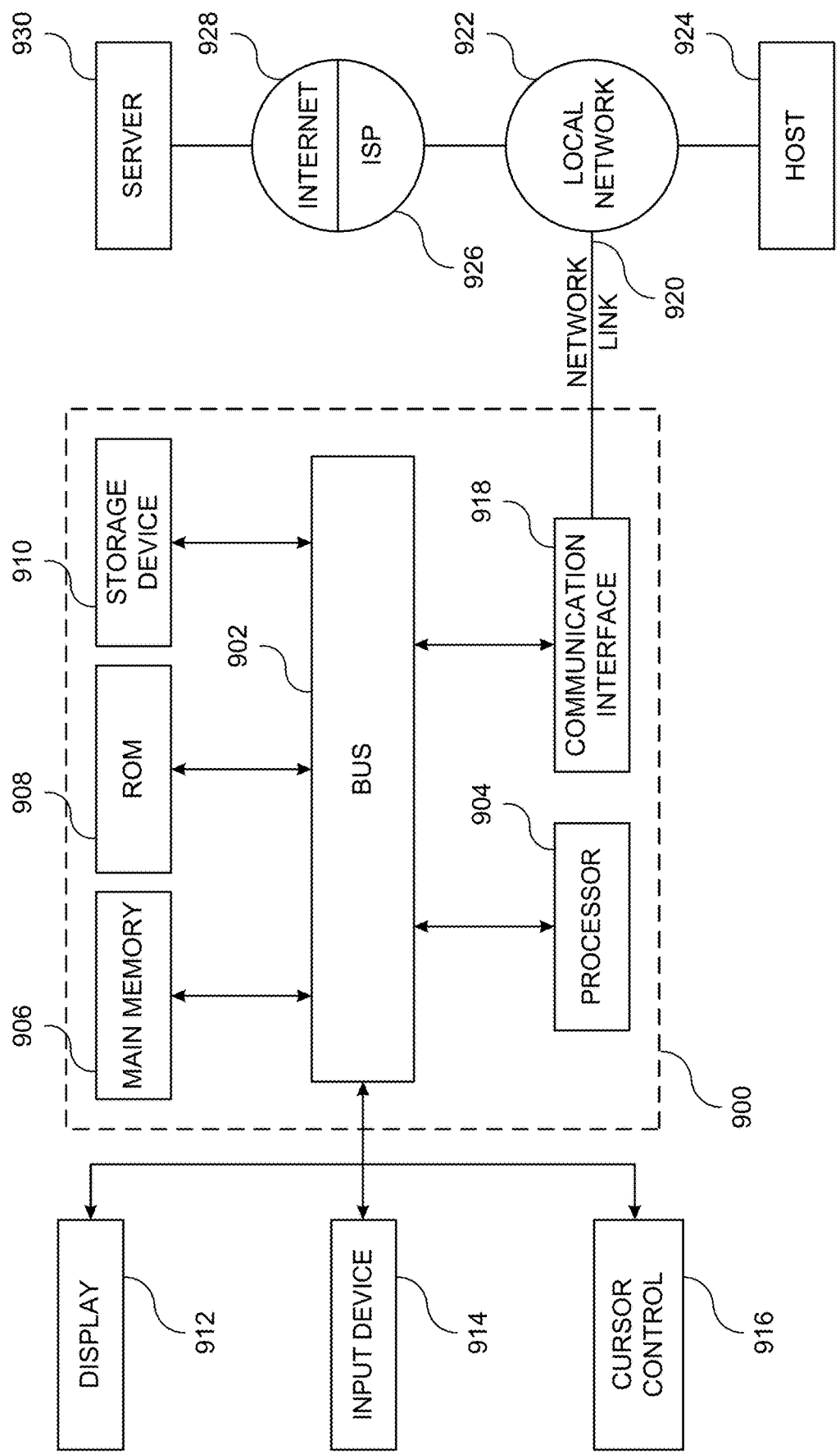
FIG. 9 is a block diagram showing an example computer system upon which aspects of this disclosure may be implemented.

FIG. 9 is a block diagram showing an example of a computer system 900 upon which aspects of this disclosure may be implemented. The computer system 900 may include a bus 902 or other communication mechanism for communicating information, and a processor 904 coupled with the bus 902 for processing information. The computer system 900 may also include a main memory 906, such as a random-access memory (RAM) or other dynamic storage device, coupled to the bus 902 for storing information and instructions to be executed by the processor 904. The main memory 906 may also be used for storing temporary variables or other intermediate information during execution of instructions to be executed by the processor 904. The computer system 900 may implement, for example, the devices for carrying out the process 700 and 800 shown in FIGS. 7 and 8.

The computer system 900 may further include a read only memory (ROM) 908 or other static storage device coupled to the bus 902 for storing static information and instructions for the processor 904. A storage device 910, such as a flash or other non-volatile memory may be coupled to the bus 902 for storing information and instructions.

The computer system 900 may be coupled via the bus 902 to a display 912, such as a liquid crystal display (LCD), for displaying information. One or more user input devices, such as the example user input device 914 may be coupled to the bus 902, and may be configured for receiving various user inputs, such as user command selections and communicating these to the processor 904, or to the main memory 906. The user input device 914 may include physical structure, or virtual implementation, or both, providing user input modes or options, for controlling, for example, a cursor, visible to a user through display 912 or through other techniques, and such modes or operations may include, for example virtual mouse, trackball, or cursor direction keys.

The computer system 900 may include respective resources of the processor 904 executing, in an overlapping or interleaved manner, respective program instructions. Instructions may be read into the main memory 906 from another machine-readable medium, such as the storage device 910. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 910. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 900 may also include a communication interface 918 coupled to the bus 902, for two-way data communication coupling to a network link 920 connected to a local network 922. The network link 920 may provide data communication through one or more networks to other data devices. For example, the network link 920 may provide a connection through the local network 922 to a host computer 924 or to data equipment operated by an Internet Service Provider (ISP) 926 to access through the Internet 928 a server 930, for example, to obtain code for an application program.

In the following, further features, characteristics and advantages of the invention will be described by means of items:

Item 1. A device for de-duplicating localized resources, comprising a processor; and a memory in communication with the processor, the memory comprising executable instructions that, when executed by the processor, cause the processor to control the device to perform functions of: accessing, from a data storage, a source resource package and a localized resource package containing first and second resources, respectively; filtering the localized resource package to identify the second resources that are not duplicates of the first resources; creating, based on the first resources, a language-neutral resource collection comprising a plurality of language-neutral resources; creating a localized resource collection comprising the second resources that are not duplicates of the first resources; and creating a deployment resource package containing the language-neutral and localized resource collections.

Item 2. The device of Item 1, wherein, for filtering the localized resource package, the instructions, when executed by the processor, further cause the processor to control the device to perform functions of: comparing the second resources to the first resources; identifying, based on the comparison, the second resources that are the duplicates of the first resources; and removing, from the localized resource package, the duplicate second resources.

Item 3. The device of Item 2, wherein, for identifying the second resources that are the duplicates of the first resources, the instructions, when executed by the processor, further cause the processor to control the device to perform functions of: determining a threshold similarity level; and determining whether each second resource meets the threshold similarity level with respect to any of the first resources.

Item 4. The device of Item 2, wherein the localized resource collection comprises only the second resources that are not removed from the localized resource package after the filtering.

Item 5. The device of Item 1, wherein the language-neutral resource collection comprises the first resources contained in the source resource package.

Item 6. The device of Item 1, wherein the language-neutral resources are in an authoring language of the source resource package.

Item 7. The device of Item 6, wherein the second resources are in a local language that is different from the authoring language.

Item 8. The device of Item 1, wherein localized resource collection has fewer second resources than the localized resource package.

Item 9. The device of Item 1, wherein: the localized resource package is a first localized resource package, the localized resource collection is a first localized resource collection, and the instructions, when executed by the processor, further cause the processor to control the device to perform functions of: accessing, from the data storage, a second localized resource package containing a plurality of third resources; filtering the second localized resource package to identify the third resources that are not duplicates of the first resources; and creating, a second localized resource collection comprising the third resources that are not duplicates of the first resources.

Item 10. The device of Item 9, wherein, for creating the deployment resource package, the instructions, when executed by the processor, further cause the processor to control the device to perform a function of including the second localized collection in the deployment resource package.

Item 11. A method of operating a device for de-duplicating localized resources, comprising: accessing, from a data storage, a source resource package and a localized resource package containing first and second resources, respectively; filtering the localized resource package to identify the second resources that are not duplicates of the first resources; creating, based on the first resources, a language-neutral resource collection comprising a plurality of language-neutral resources; creating a localized resource collection comprising the second resources that are not duplicates of the first resources; and creating a deployment resource package containing the language-neutral and localized resource collections.

Item 12. The method of Item 11, wherein filtering the localized resource package comprises: comparing the second resources to the first resources; identifying, based on the comparison, the second resources that are the duplicates of the first resources; and removing, from the localized resource package, the duplicate second resources.

Item 13. The method of Item 12, wherein identifying the second resources that are the duplicates to the first resources comprises: determining a threshold similarity level; and determining whether each second resource meets the threshold similarity level with respect to any of the first resources.

Item 14. The method of Item 12, wherein the localized resource collection comprises only the second resources that are not removed from the localized resource package after the filtering.

Item 15. The method of Item 11, wherein the language-neutral resource collection comprises the first resources contained in the source resource package.

Item 16. The method of Item 11, wherein the language-neutral resources are in an authoring language of the source resource package.

Item 17. The method of Item 16, wherein the second resources are in a local language that is different from the authoring language.

Item 18. The method of Item 11, wherein: the localized resource package is a first localized resource package, the localized resource collection is a first localized resource collection, and the instructions, when executed by the processor, further cause the processor to control the device to perform functions of: accessing, from the data storage, a second localized resource package containing a plurality of third resources; filtering the second localized resource package to identify the third resources that are not duplicates of the first resources; and creating, a second localized resource collection comprising the third resources that are not duplicates of the first resources.

Item 19. The method of Item 18, wherein creating the deployment resource package comprises including the second localized collection in the deployment resource package.

Item 20. A non-transitory computer readable medium containing instructions which, when executed by a processor, cause a computer to perform functions of: accessing, from a data storage, a source resource package and a localized resource package containing first and second resources, respectively; filtering the localized resource package to identify the second resources that are not duplicates of the first resources; creating, based on the first resources, a language-neutral resource collection comprising a plurality of language-neutral resources; creating a localized resource collection comprising the second resources that are not duplicates of the first resources; and creating a deployment resource package containing the language-neutral and localized resource collections.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device for de-duplicating localized resources, comprising:
   a processor; and
   a memory in communication with the processor, the memory comprising executable instructions that, when executed by the processor, cause the processor to control the device to perform functions of:
      accessing, from a computer data storage, a source resource package and a localized resource package containing first and second resources, respectively, wherein the first resources and the second resources comprise computer resources;
      filtering the localized resource package to identify the second resources that are not duplicates of the first resources;
      creating, based on the first resources, a language-neutral resource container comprising a plurality of language-neutral resources;
      creating a localized resource container comprising the second resources that are not duplicates of the first resources, wherein the language-neutral resource container and the localized resource container comprise a computer container;
      creating a deployment resource package containing the language-neutral resource container and the localized resource container;
      deploying the deployment resource package containing the language-neutral resource container and localized resource container on hardware assets; and
      updating the deployment resource package on the hardware assets by updating only the language-neutral resource container.

2. The device of claim 1, wherein, for filtering the localized resource package, the instructions, when executed by the processor, further cause the processor to control the device to perform functions of:
   comparing the second resources to the first resources;
   identifying, based on the comparison, the second resources that are the duplicates of the first resources; and
   removing, from the localized resource package, the duplicate second resources.

3. The device of claim 2, wherein, for identifying the second resources that are the duplicates of the first resources, the instructions, when executed by the processor, further cause the processor to control the device to perform functions of:
   determining a threshold similarity level; and
   determining whether each second resource meets the threshold similarity level with respect to any of the first resources.

4. The device of claim 2, wherein the localized resource container comprises only the second resources that are not removed from the localized resource package after the filtering.

5. The device of claim 1, wherein the language-neutral resource container comprises the first resources contained in the source resource package.

6. The device of claim 1, wherein the language-neutral resources are in an authoring language of the source resource package.

7. The device of claim 6, wherein the second resources are in a local language that is different from the authoring language.

8. The device of claim 1, wherein localized resource container has fewer second resources than the localized resource package.

9. The device of claim 1, wherein:
the localized resource package is a first localized resource package,
the localized resource container is a first localized resource container, and
the instructions, when executed by the processor, further cause the processor to control the device to perform functions of:
accessing, from the data storage, a second localized resource package containing a plurality of third resources;
filtering the second localized resource package to identify the third resources that are not duplicates of the first resources; and
creating, a second localized resource container comprising the third resources that are not duplicates of the first resources.

10. The device of claim 9, wherein, for creating the deployment resource package, the instructions, when executed by the processor, further cause the processor to control the device to perform a function of including the second localized container in the deployment resource package.

11. A method of operating a device for de-duplicating localized resources, comprising:
accessing, from a computer data storage, a source resource package and a localized resource package containing first and second resources, respectively, wherein the first resources and the second resources comprise computer resources;
filtering the localized resource package to identify the second resources that are not duplicates of the first resources;
creating, based on the first resources, a language-neutral resource container comprising a plurality of language-neutral resources, wherein the language-neutral resource container and the localized resource container comprise a computer container;
creating a localized resource container comprising the second resources that are not duplicates of the first resources;
creating a deployment resource package containing the language-neutral and localized resource containers;
deploying the deployment resource package containing the language-neutral resource container and localized resource container on hardware assets; and
updating the deployment resource package on the hardware assets by updating only the language-neutral resource container.

12. The method of claim 11, wherein filtering the localized resource package comprises:
comparing the second resources to the first resources;
identifying, based on the comparison, the second resources that are the duplicates of the first resources; and
removing, from the localized resource package, the duplicate second resources.

13. The method of claim 12, wherein identifying the second resources that are the duplicates to the first resources comprises:

determining a threshold similarity level; and
determining whether each second resource meets the threshold similarity level with respect to any of the first resources.

14. The method of claim 12, wherein the localized resource container comprises only the second resources that are not removed from the localized resource package after the filtering.

15. The method of claim 11, wherein the language-neutral resource container comprises the first resources contained in the source resource package.

16. The method of claim 11, wherein the language-neutral resources are in an authoring language of the source resource package.

17. The method of claim 16, wherein the second resources are in a local language that is different from the authoring language.

18. The method of claim 11, wherein:
the localized resource package is a first localized resource package,
the localized resource container is a first localized resource container, and
further comprising:
accessing, from the data storage, a second localized resource package containing a plurality of third resources;
filtering the second localized resource package to identify the third resources that are not duplicates of the first resources; and
creating, a second localized resource container comprising the third resources that are not duplicates of the first resources.

19. The method of claim 18, wherein creating the deployment resource package comprises including the second localized container in the deployment resource package.

20. A non-transitory computer readable medium containing instructions which, when executed by a processor, cause a computer to perform functions of:
accessing, from a computer data storage, a source resource package and a localized resource package containing first and second resources, respectively, wherein the first resources and the second resources comprise computer resources;
filtering the localized resource package to identify the second resources that are not duplicates of the first resources;
creating, based on the first resources, a language-neutral resource container comprising a plurality of language-neutral resources, wherein the language-neutral resource container and the localized resource container comprise a computer container;
creating a localized resource container comprising the second resources that are not duplicates of the first resources;
creating a deployment resource package containing the language-neutral and localized resource containers;
deploying the deployment resource package containing the language-neutral resource container and localized resource container on hardware assets; and
updating the deployment resource package on the hardware assets by updating only the language-neutral resource container.

* * * * *